United States Patent [19]

Wagner et al.

[11] Patent Number: 5,541,582
[45] Date of Patent: Jul. 30, 1996

[54] APPARATUS FOR DATA COMMUNICATION SWITCHING

[75] Inventors: Richard H. Wagner, Dunwoody, Ga.; James R. Behrens, Macedon; Robert L. Wagner, Rochester, both of N.Y.

[73] Assignee: Datascape, Inc., Atlanta, Ga.

[21] Appl. No.: 180,858

[22] Filed: Jan. 13, 1994

[51] Int. Cl.$^6$ ............................................. H04Q 1/00
[52] U.S. Cl. ................... 340/825.51; 395/114; 370/112
[58] Field of Search ....................... 340/825.50, 825.51, 340/825; 395/114, 275; 364/238.2; 370/112; 307/243; 328/154

[56] References Cited

U.S. PATENT DOCUMENTS

| | | | |
|---|---|---|---|
| 4,040,014 | 8/1977 | Gehrking | 340/825.5 |
| 4,045,774 | 8/1977 | Morrison | 340/825.5 |
| 4,063,220 | 12/1977 | Metcalfe | 340/825.5 |
| 4,189,766 | 2/1980 | Horiguchi | 340/825.5 |
| 4,314,164 | 2/1982 | Tin | 328/154 |
| 4,366,480 | 12/1982 | Van Hatten | 340/825.51 |
| 4,508,399 | 4/1985 | Dowling et al. | 339/17 CF |
| 4,941,845 | 7/1990 | Eppley et al. | 439/505 |
| 4,962,379 | 10/1990 | Yasuda | 340/825.5 |
| 4,985,890 | 1/1991 | Matsumoto | 340/825.5 |
| 4,988,890 | 1/1991 | Narhi et al. | 307/147 |
| 5,034,598 | 7/1991 | Poland | 235/435 |
| 5,263,171 | 11/1993 | Asprey | 340/825.5 |

*Primary Examiner*—Brian Zimmerman
*Attorney, Agent, or Firm*—Morris, Manning & Martin L.L.P.

[57] ABSTRACT

A serial communication apparatus for directing data from a plurality of data input devices to a single data output device comprising a plurality of serial input connectors, a serial output connector, and logic and driver circuitry. The logic and driver circuitry automatically regulate the conditions under which a data input device transmits data to the data output device. In the illustrated embodiment of four data input devices, when all are idle, any of them may transmit data to the output device. If one data input device attempts to transmit data while the another data input device is transmitting data, then the logic and driver circuitry causes the second input device to pause until the first input device data transmission is complete. If both input devices attempt simultaneous data transmission, the logic and driver circuitry resolves the contest and allows only one data input device to transmit to the output device at a time.

19 Claims, 3 Drawing Sheets

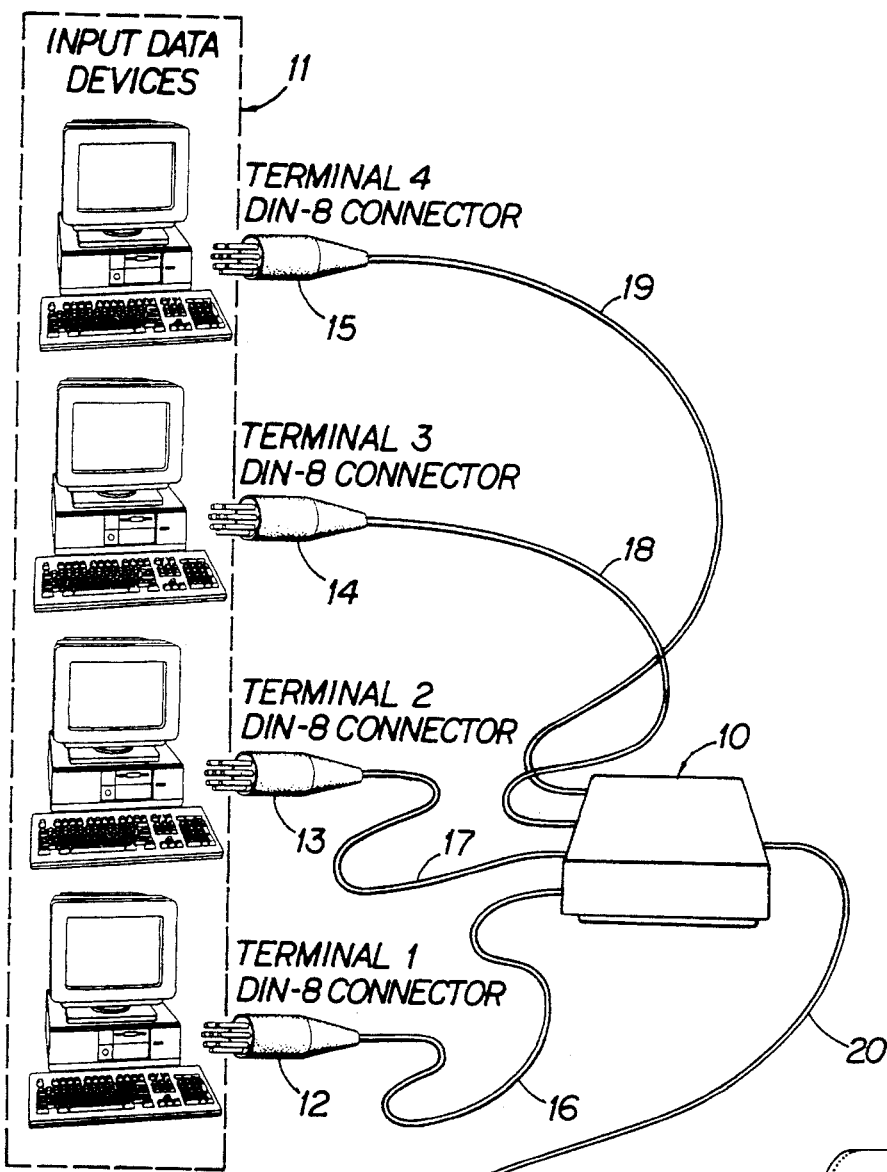
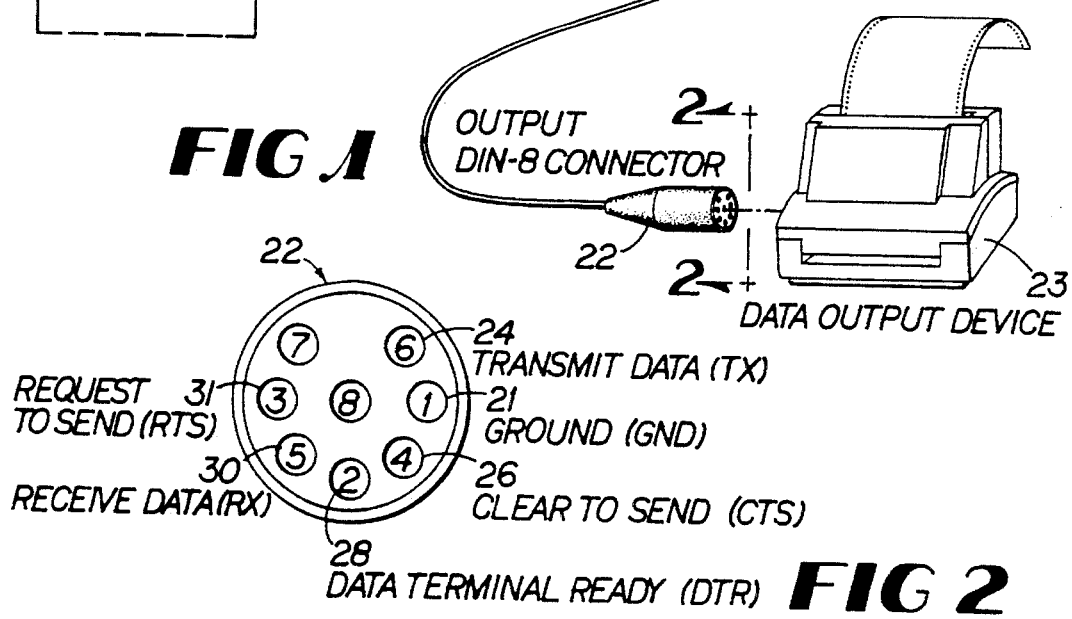
FIG 1
FIG 2

5,541,582

APPARATUS FOR DATA COMMUNICATION SWITCHING

FIELD OF THE INVENTION

The present invention relates to communication switching devices, and more particularly to devices for regulating data flow between terminals.

BACKGROUND OF THE ART

Micro-computer terminals and printers are frequently used for the electronic transacting of consumer payments in a retail store using credit cards. In general, the retailer inputs the consumer's payment account number into the terminal, typically a device having a keypad and a magnetic card reader, and the terminal approves the transaction by communicating with a remote host computer. Upon approval, the micro-computer directs the printer connected thereto to create a receipt, which is signed by the consumer as a written record of consent to pay the retailer. The entire process takes about two minutes. To save time, some micro-computer terminals print a portion of the receipt, referred to as the print header, concurrently while requesting an approval. After an approval is obtained, the remainder of the receipt, referred to as the print trailer, is printed.

In order to meet the increased demand for credit card transaction processing during peak times while keeping costs low, a number of micro-computer terminals may be connected to a single printer. Because the printed data takes only a short time to transmit, a number of transactions can be printed in without significant delay on a single printer if they are transmitted in sequence. The problem is that two or more micro-computer terminals may attempt to transmit data to a printer simultaneously, thereby causing potential confusion by the printer regarding the data; or one micro-computer terminal may be in the process of transmitting data when a second micro-computer terminal initiates a data transfer, again potentially causing a printer malfunction.

It would be desirable to have an apparatus that would automatically direct micro-computer terminal data traffic to a single printer so as to avert this confusion. It would be desirable for such an apparatus to be conveniently added to an existing micro-computer terminal and printer system without requiring modification to either the micro-computer terminal or the printer.

SUMMARY OF THE INVENTION

The present invention provides an apparatus which automatically directs data signals from two or more data input devices, such as micro-computer point of sales terminals, to a single data output device, such as a printer.

In a preferred embodiment, the present invention provides four standard serial input connectors with cables, which can be attached to micro-computer based point of sales terminals, and a standard serial output connector with a cable which can be attached to a printer terminal connector. The input and output cables are coupled by logic and driver circuitry.

In the illustrated embodiment of four data input devices, when all data input devices are idle, any of them may transmit data to the output device. If one data input device attempts to transmit data while the another data input device is transmitting data, then the logic and driver circuitry causes the second input device to pause until the first input device data transmission is complete. If two or more input devices attempt simultaneous data transmission, the logic and driver circuitry resolves the contest and allows only one input device to transmit to the output device at a time. Time delays are provided after the end of each transmission to allow multiple transmissions to form one transaction and to permit output device controlled pauses during transactions.

Accordingly, it is a principal object of the present invention to provide an apparatus that can direct the flow of data automatically from multiple micro-computer terminals to a single output printer.

It is a further object of the present invention to provide an apparatus which can resolve contentions among multiple data signals in order to present a single data signal to a printer.

It is yet a further object of the present invention to provide an apparatus having a plurality of input connectors capable of connecting to a plurality of micro-processors, a single output connector capable of connecting to an output device, and circuitry capable of directing and/or delaying a data signal to the output device.

Other objects, features, and advantages of the present invention will become apparent upon reading the following detailed description of embodiments of the invention, when taken in conjunction with the accompanying drawings and the appended claims.

BRIEF DESCRIPTION OF THE DRAWINGS

The invention is illustrated in the drawings in which like reference characters designate the same or similar parts throughout the figures of which:

FIG. 1 is a pictorial representation of a communication apparatus constructed in accordance with the present invention.

FIG. 2 is a pictorial representation of the pin out description for a standard DIN-8 connector used for RS-232 serial data communication.

DESCRIPTION OF THE PREFERRED EMBODIMENTS

Figure 3A:
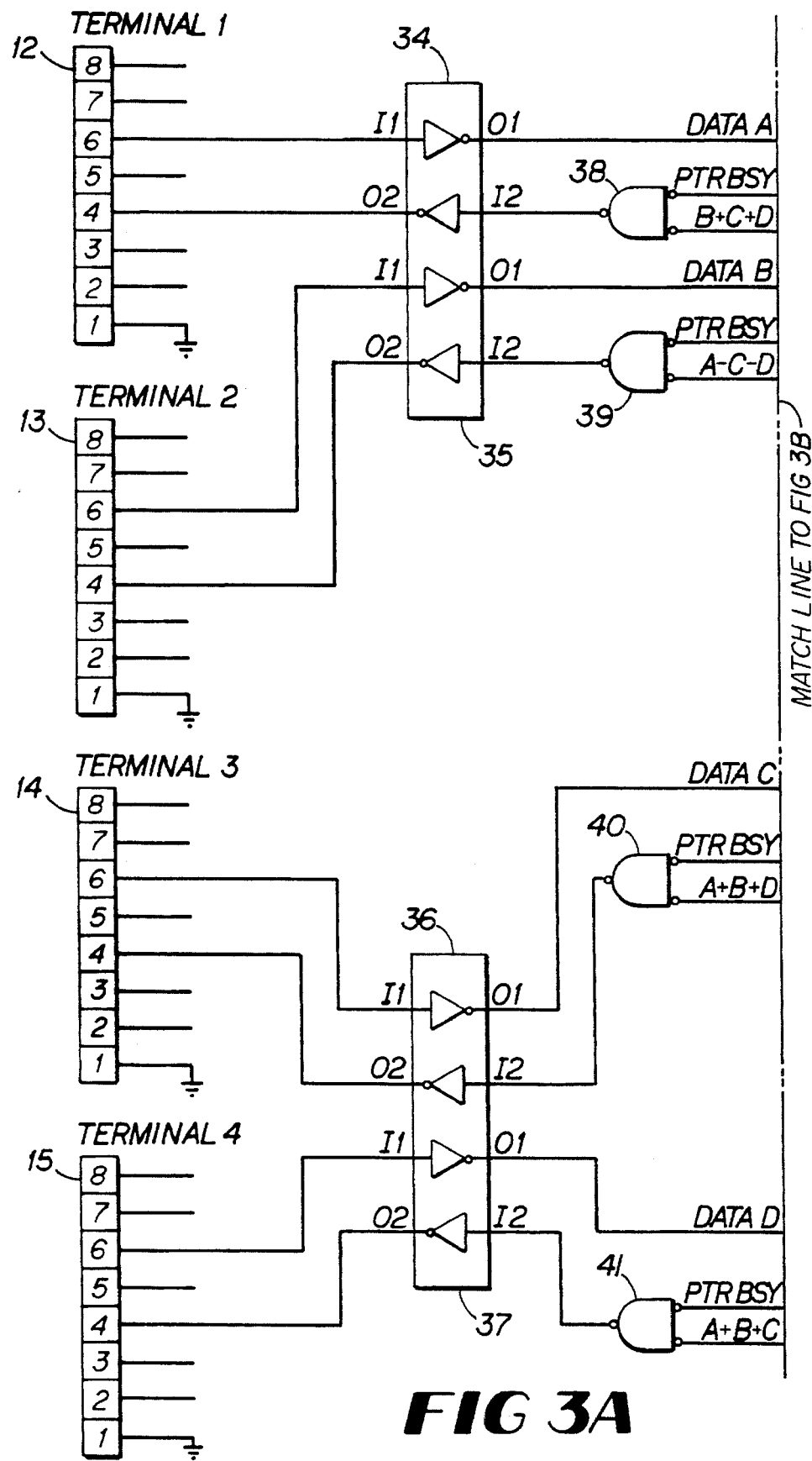
FIG. 3 shows a detailed schematic diagram of communications apparatus illustrated in FIG. 1.

With reference now to FIG. 1 there is shown a communication apparatus 10 which comprises logic and driver circuitry (more fully described hereinafter) contained in a suitable housing. The apparatus 10 has a plurality of input connectors 12, 13, 14 and 15 coupled by cables 16, 17, 18 and 19, respectively to the circuitry contained within the housing and an output connector 22 coupled by a cable 20 to the circuitry contained within the housing. The input connectors 12, 13, 14 and 15 are each adapted to be electrically coupled to separate data input devices 11, such as terminals for point of sales transactions a–d, which may each contain a micro-computer. The output connector 22 is adapted to be electrically coupled to a data output device, such as a printer 23 for the point of sales terminals.

The apparatus 10 functions to automatically couple one of the data input devices 11 to the data output device 23 to transfer data to it while causing the other input device to pause or be disabled until the first is finished. The apparatus 10 also functions to resolve contentions between the data input devices 11 for the resource of the data output device 23 in an elegant and inexpensive manner. In a preferred embodiment, the communication apparatus 10 is a serial communication apparatus which has four serial inputs which it couples on a selective basis to a single serial output. It will become evident that the invention applies to any number of input devices from two to N, where N is an integer.

The data protocol used by the input and output devices in the illustrated embodiment is a serial RS-232 format. The connectors 12, 13, 14, 15 and 22 are standard serial connectors having eight external conductor pins or internal receptacles depending on the gender of the particular connector. In this regard, connectors 12, 13, 14 and 15 are serial DIN 8-pin male connectors of the circular configuration and connector 22 is a serial DIN 8-pin female connector of the circular configuration. One of the objects of the invention is to replace a standard connection configuration for an input data device which has a RS-232 female output connector coupled via a cable to an RS-232 male input connector of an output device.

The apparatus 10 in the illustrated configuration will allow four point of sale input data terminals 1–4 to drive the same output printer 23 without any of them having to be adapted for special connections or modified to operate differently. The input cables of the communications apparatus 10 plug directly into the female connectors of the data input devices 11 and the output cable plugs directly into the male input connector of the data output device 23. Although the there is more than one data input device 11 accessing the printer 23, it appears to each data input device that it is the only one and to the printer that only one device is present thereby making the communications apparatus 10 transparent.

FIG. 2 illustrates the pin-out nomenclature for the standard DIN-8 connectors 12, 13, 14, 15 and 23. It is noted that the conductors are in the same order whether the end connections are pins (male) or receptacles (female). The eight conductors of a DIN-8 connector allow for a bidirectional serial data transmission over one cable. The transmit conductor 24 (pin 6) provides a path in conjunction with the ground conductor 21 (pin 5) to transmit serial data through the connector and any cable attached thereto to another device. The receive conductor 30 (pin 5) provides a path in conjunction with the ground conductor 21 (pin 1) to receive serial data from the connector and any cable attached thereto from another device. The request to send conductor 31 (pin 3) and the data terminal ready conductor 28 (pin 2) are used in conjunction with a interrogation and reply protocol for control between an input and an output device.

A simpler control protocol is provided by the clear to send conductor 26 (pin 4) which can be monitored by an input data device to determine if the output data device is ready to receive data. This is the preferred protocol for the RS-232 serial data transmission of the communications apparatus 10 where an data input device tests the clear to send conductor 26 of its connector and pauses (delays transmission) if the data output device is not ready to accept data. When the clear to send conductor 26 is at the correct logic level, then the data input device will transmit in RS-232 serial format over the transmit data conductor 24. Conversely, the data output device, when it is ready to receive data, will signal the data input device by the clear to send conductor 26 and then receive the transmitted data via the receive data conductor 30.

As is conventionally known, the RS-232 serial data format is a byte format protocol where data is sent serially in characters of nine bits comprising one start bit, eight data bits, and one stop bit. The protocol allows the overlayer of message control such as a start of message sequence, a length of message sequence, an end of message sequence and other control characters. However, each byte and therefore all data transmissions begin with a start bit. This part of the RS-232 protocol is used to test for the start of a data transmission as will be more fully explained hereinafter.

Figure 3B:
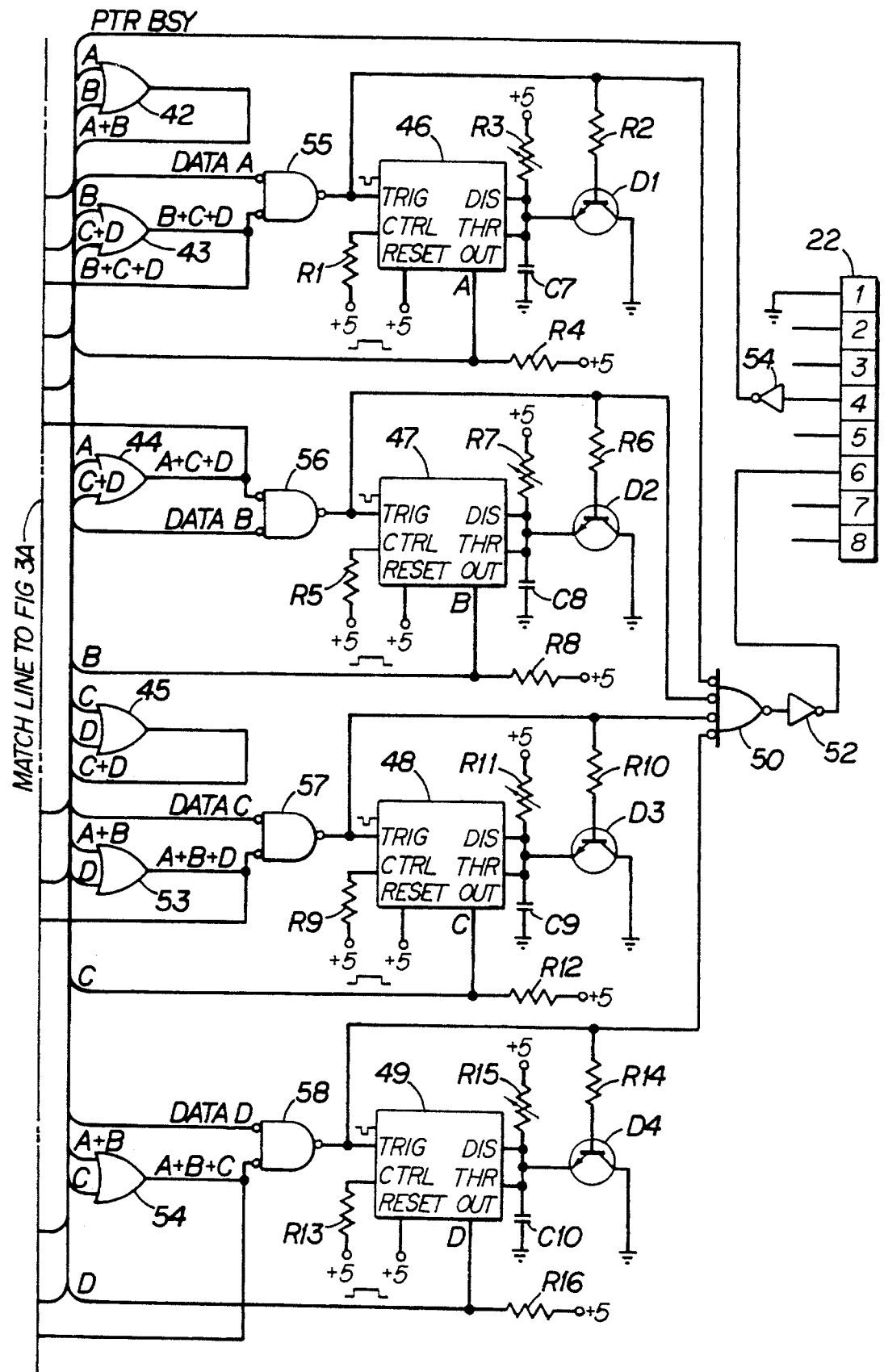

FIG. 3 is a detailed electrical schematic diagram of the connectors 12, 13, 14, 15 and 22 coupled to the logic and driver circuitry used to implement the automatic communication apparatus 10 of the invention. The input connector 12 is coupled via its transmit conductor (pin 6) to a first input I1 of a bidirectional driver circuit 34 and has its clear to send conductor (pin 4) coupled to a second output O2 of the driver circuit 34. A first output O1 of the driver circuit 34, which corresponds to the first input I1, is coupled to one of the negative true inputs of a NAND gate 55 while a second input I2 of the driver circuit, which corresponds to the second output O2, is coupled to the output of a NAND gate 38.

The function of the driver circuit 34 is to provide a bidirectional communications paths between the logic circuitry which act on logic levels (0 V. to +5 V.) and the RS-232 communication connector paths which act on bilevel data levels (−12 V. to +12 V.). This permits logical testing and combination of the signals over these paths by the logic circuitry without changing the input and output protocol or causing conversion problems for the data input device connected to the connector 12. In one direction, the driver circuit 34 takes a bilevel data transmit signal from the transmit conductor (pin 6) and converts it to a logic level data transmit signal which can be used by the NAND gate 55, while in the other direction, the driver circuit takes a logic level clear to send signal output from NAND gate 38 and converts it to a bilevel clear to send signal which can be input on the clear to send conductor (pin 4) of the connector 12.

A similar function is performed by driver circuits 35, 36, and 37 which, in one direction, receive bilevel data transmit signals input to their I1 inputs from the transmit conductors (pin 6) of connectors 13, 14, and 15, respectively and converts them to logic level data transmit signals for output at the O1 outputs to one of the inputs of NAND gates 56, 57, and 58, respectively. In the other direction, the driver circuits 35, 36, and 37 receive logic level clear to send signals output from NAND gates 39, 40 and 41 at inputs I2 and converts them to bilevel clear to send signals at outputs O2 for connection to the clear to send conductors (pin 4) of the connectors 13, 14, and 15, respectively.

In a similar manner, at the output connector 22, a driver circuit 54 converts the bilevel clear to send signal from the clear to send conductor (pin 4) of the connector to a logic level clear to send signal which is input to one of the inputs of NAND gates 38, 39, 40 and 41. A logic level data transmit signal from the output of NOR gate 50 is converted to a bilevel data transmit signal by a driver circuit 52 for input to the data transmit conductor (pin 6) of the connector 22.

The driver circuits 34, 35, 36, 37, 52 and 54 thereby provide a convenient interface between the bilevel signals of the connectors 12, 13, 14, 15, and 22 and the logic level signals of the logic circuitry. The driver circuits not only provide an interface between two signal formats, logic level and bilevel, but also provide a signal conditioning and shaping function and an inversion of the signals which allows common negative true input and output logic to be more easily utilized.

The logic circuitry comprises, for one data signal path, the NAND gates 38 and 55, OR gate 43, and a timer 46 with its associated circuitry of a resistors R1–R4, a capacitor C7 and a PNP transistor Q1. For a second data signal path, the logic circuitry comprises the NAND gates 39 and 56, OR gate 44, and a timer 47 with its associated circuitry of a resistors R5–R8, a capacitor C8 and a PNP transistor Q2. For a third data signal path, the logic circuitry comprises the NAND gates 40 and 57, OR gate 53, and a timer 48 with its associated circuitry of a resistors R9–R12, a capacitor C9 and a PNP transistor Q3. A fourth data signal path comprises the NAND gates 41 and 58, OR gate 54, and a timer 49 with its associated circuitry of a resistors R13–R16, a capacitor C10 and a PNP transistor Q4.

Each data signal path is similar and bidirectional such that, in one direction it communicates the data transmit signal from a respective data input device to the data output device while, in the other direction, it communicates the clear to send signal from the data output device to the respective input device. For example in the first path, the data transmit signal from the data input device coupled to connector 12 is inverted in driver 34 and interfaced to the NAND gate 55. The data transmit signal is inverted in the NAND gate 55 and then output from the gate to one of the inputs of the OR gate 50 where it is again inverted. A fourth inversion and interface to the data output device coupled to connector 22 is provided by the driver 52. The clear to send signal from the data output device is interfaced through the driver 54 to the NAND gate 38 whose output is then interfaced to the data input device of connector 12 through the driver 34. Each data path is similar and mimics a standard two wire cable connection between the input device and the output device.

To prevent more than one input device having access to the output resource at one time and to resolve contentions among them, each of the data paths will generate seizure signals A–D from the outputs of the timers 46–49 which cause the OR gates 43, 44, 53 and 54 to generate busy signals which disable their respective data paths. For example, a high logic level output from OR gate 43 will disable NAND gate 55 preventing the data transmit signal of the first data path from passing through it and will disable NAND gate 38 preventing the clear to send signal from passing through it. A high logic level from OR gate 44 will disable the second data path, a high logic level signal from OR gate 53 will disable the third data path, and a high logic level signal from OR gate 54 will disable the fourth data path.

The busy signal for a particular path is the logical OR combination of the seizure signals from all of the other data paths. The first data path is disabled if the seizure signals B+C+D are present; the second data path is disabled if the seizure signals A+C+D are present; the third data path is disabled if the seizure signals A+B+D are present; and the fourth data path is disabled if the seizure signals A+B+C are present. OR gates 42 and 45 combine seizure signals A+B and C+D, respectively for input to OR gates 43, 44, 53 and 54.

Because each of the seizure signals A–D is generated similarly by the timers 46–49 only the generation of the seizure signal A will be discussed. The timer 46 receives the output of the NAND gate 55 at its trigger input TRG and has its discharge and threshold inputs, DIS, THR connected to the junction of the resistor R3 and the capacitor C7. The transistor Q1 has its base connected to the output of the NAND gate 55 through resistor R2, its emitter connected to the junction of the resistor R3 and the capacitor C7, and its emitter connected to ground.

In this configuration, the timer 46 will be triggered by a low logic level signal from the NAND gate 55 to produce a high logic level from its output OUT for a predetermined duration, determined by the time constant of the resistor and capacitor combination. The predetermined period may be varied by adjusting R3 which is shown as a potentiometer. At the end of the time period, the output OUT of the timer 46 will then make a transition to a low logic level. The transistors Q1 forms an alternative discharge path for the time constant circuit of the timer 46 such that when the output of the NAND gate goes to a low logic level, the time period will be reset to start over until the data ends. The output of the timer 46 is used as the disabling seizure signal A to the other data paths.

There are several operational modes of the communications apparatus 10 which will now be more fully explained. The first mode is when all data input devices 11 are idle and the data output device 23 has been idle for some time greater than the time periods provided by the timers 46, 47, 48 and 49. In this case, the data output device 23 will generate its clear to send signal on pin 4 of connector 22 to indicate that it is ready to receive data. Because there are no seizure signals, all NAND gates 38–41 and 55–58 are enabled to allow the clear to send signal through to all input devices and all data transmit signals through to the data output device 23.

Since all data input devices 11 have an indication that the data output device 23 is in a ready condition, they all have an equal chance to seize it. Likewise, if for some reason the data output device becomes unable to receive data during the idle mode, it will negate the clear to send signal and all data input devices will pause until the clear to send signal is reasserted.

A seizure mode is entered when one of the data input devices 11 begins to transmit data. If it is the data input device coupled to connector 12, its data transmit signal will flow through the driver 34, enabled NAND gate 55, the NOR gate 50, and the driver 52 to the transmit conductor (pin 6) of the connector 22. In addition, the first bit (which in RS-232 is a high logic level start bit), inverted at the output of NAND gate 55, will cause the timer 46 to trigger producing a high logic level seizure signal A from its output OUT. The seizure signal A disables the clear to send signal to the all the other input devices and disables the data transmit signals from all of the other input devices by causing the generation of the busy signals from OR gates 44, 53 and 54.

These actions cause the other data input devices to pause and prevent data transmit signals from the other devices from seizing the communication apparatus 10. The other data input devices will remain locked out until the data input device which seized the apparatus 10 stops transmitting data and for a predetermined time thereafter. The time out provides a facile method to solve two contention problems. The first is when the active data input device pauses in its data transmission because of a two or more step transaction, i.e., a point of sale transaction with a header and a trailer, the active device does not drop its seizure immediately. If an alternate device were allowed to seize the output device in the middle of a transaction just because the active device paused for a few seconds in its transmission, then many transactions could be mixed on the output print out instead of being printed as integral transactions. Thus, when the active data input device stops transmitting, the time out, preferably 20 seconds, begins to allow the active terminal enough time to start another transmission and complete another part of the transaction. If it begins transmitting again before the time out is finished, then the time period is reset to allow multiple parts to be accomplished. The time out associated with each data input device can be tailored to the application by adjusting the potentiometer of the corresponding timer. The time periods set for the system can be all the same but of a variable duration, or the can be individually variable, as is needed.

The second problem occurs when the data output device must pause for some reason during the transmission activity. The data output device will negate the clear to send signal and cause the active data input device to pause while waiting for the signal to become enabled again. When it does, the apparatus 10 should not give precedence to the alternate data input device; it should allow the previously active data input device to finish its transaction. The time out and seizure mechanism of the present invention allows this to happen in an inexpensive and uncomplicated manner.

Simultaneous seizure of the apparatus 10 is avoided by allowing the first data bit of a data transmit signal of an active data input device to disable the others data transmission and clear to send signals. It is highly unlikely that the start bits from two or more data transmit signals will arrive simultaneously. However, if they do then all inputs will be paused until the apparatus clears. This causes a natural pause in the alternate data terminal transmissions which can then continue when the active terminal is clear.

While the invention has been described in connection with certain preferred embodiments, it is not intended to limit the scope of the invention to the particular forms set forth, but, on the contrary, it is intended to cover any such alternatives, modifications, and equivalents as may be included within the spirit and scope of the invention as defined by the appended claims.

What is claimed is:

1. A method of data transmission from a plurality of data input devices, each having a data transmit output for transmitting data signals to a data output device and a clear to send input for receiving a signal enabling the sending of data signals to a data output device having a clear to send output and a data receive input, said method comprising the steps of:

generating a seizure signal for each input device in response to a data signal being transmitted on said data transmit output for any one of said each input device; and transmitting said generated seizure signal for each data input device to said other input devices whereby said seizure signal generated in response to said data signal being transmitted by one of said input devices prevents said other input devices from transmitting a data signal to said output device.

2. A method of data transmission as set forth in claim 1 wherein said step of transmitting said seizure signal includes the step of:

gating said seizure signal generated for a first data input device with said data transmit output for each of said other data input devices.

3. A method of data transmission as set forth in claim 1 wherein said step of transmitting said seizure signal includes the step of:

gating said seizure signal generated for a first data input device with said clear to send input for each of said other input devices to prevent said other input devices from transmitting a data signal.

4. A method of data transmission as set forth in claim 1 wherein said step of generating said seizure signal includes the step of:

generating said seizure signal for a predetermined period of time.

5. A method of data transmission as set forth in claim 4 wherein said step of generating said seizure signal includes the step of:

varying said predetermined period of time for each said seizure signal.

6. A method of data transmission as set forth in claim 1 which further includes the steps of:

converting said data signal from a bilevel signal into a logic level signal; and converting said logic level data signal a bilevel signal for said output device.

7. A method of data transmission as set forth in claim 3 which further includes the steps of:

converting a clear to send signal on one of said clear to send inputs from a bilevel signal into a logic level signal before said gating step; and converting said gated clear to send signals for each input device from a logic level signal into a bilevel signal.

8. The method of claim 5, said varying step varying said predetermined period of time independently for each input device.

9. A communications apparatus for coupling a plurality of data input devices to a data output device, said apparatus comprising:

a plurality of input connectors for coupling a plurality of data input devices to the apparatus, each connector including a clear to send output and a data transmit input;

an output connector for coupling a data output device to the apparatus, the output connector including a clear to send input and a data transmit output; and means for selectively coupling one of the data transmit inputs from one of said input connectors to the data transmit output of said output connector and disabling the data transmit inputs of said unselected input connectors in response to a data signal being transmitted on said one of the data transmit inputs.

10. A communications apparatus as set forth in claim 9 said selectively coupling means further comprising;

means for generating a busy signal for each input device, said busy signal for each input device corresponding to data being present on said data transmit input for any of said other input devices;

means for gating signals received on each data transmit input with said busy signal generated for said input device; and means for gating all of the gated signals corresponding to said data input devices at the data transmit output.

11. A communications apparatus as set forth in claim 10 further comprising;

means for gating a signal on said clear to send input of each said input connector with said busy signal for each said input connector.

12. A communications apparatus as set forth in claim 10 said means for generating a busy signal includes:

means for detecting a data transmit start signal on said transmit data input for each of said input connectors; and said means for generating said busy signal generating said busy signal for a predetermined period of time upon detection of said transmit data start signal.

13. A communications apparatus as set forth in claim 12 said means for generating a busy signal further includes:

means for detecting a data transmit end signal;

means for generating said busy signal for a predetermined period of time upon detection of said transmit data end signal.

14. A communications apparatus as set forth in claim 9 further comprising:

means for converting a bilevel data transmit signal from said data transmit inputs of said input connectors to a logic level data transmit signal.

15. A communications apparatus as set forth in claim 14 which further comprise:

means for converting a bilevel clear to send signal from a clear to send input of said output connector to a logic level clear to send signal.

16. A communications apparatus as set forth in claim 9 wherein each of said input connectors further includes a DIN-8 connector.

17. A communications apparatus as set forth in claim 16 wherein each of said input connectors further includes a DIN-8 male connector.

18. A communications apparatus as set forth in claim 9 wherein said output connector further includes a DIN-8 connector.

19. A communications apparatus as set forth in claim 18 wherein said output connector further includes a DIN-8 female connector.

* * * * *

UNITED STATES PATENT AND TRADEMARK OFFICE
CERTIFICATE OF CORRECTION

PATENT : 5,541,582

DATED : July 30, 1996

INVENTOR(S) : Wagner et al

It is certified that error appears in the above-identified patent and that said Letters Patent is hereby corrected as shown below:

Column 1, line 64, "the another' should read "another".

Column 3, line 25, "the there" should read "there".

Column 3, line 52, "an data" should read "a data".

Signed and Sealed this

Thirtieth Day of September, 1997

*Attest:*

BRUCE LEHMAN

*Attesting Officer*     *Commissioner of Patents and Trademarks*